United States Patent
Thoria et al.

(10) Patent No.: US 9,794,180 B2
(45) Date of Patent: Oct. 17, 2017

(54) REDUCING TRANSIENT PACKET DUPLICATION AND IMPROVING SPLIT-HORIZON FILTERING

(71) Applicants: Samir D. Thoria, Sunnyvale, CA (US); Keyur Patel, San Jose, CA (US); Ali Sajassi, San Ramon, CA (US)

(72) Inventors: Samir D. Thoria, Sunnyvale, CA (US); Keyur Patel, San Jose, CA (US); Ali Sajassi, San Ramon, CA (US)

(73) Assignee: Cisco Technology, Inc., San Jose, CA (US)

( * ) Notice: Subject to any disclaimer, the term of this patent is extended or adjusted under 35 U.S.C. 154(b) by 19 days.

(21) Appl. No.: 14/335,622

(22) Filed: Jul. 18, 2014

(65) Prior Publication Data

US 2016/0021015 A1    Jan. 21, 2016

(51) Int. Cl.
| | | |
|---|---|---|
| *H04L 12/851* | (2013.01) | |
| *H04L 12/46* | (2006.01) | |
| *H04L 12/721* | (2013.01) | |
| *H04L 12/723* | (2013.01) | |

(52) U.S. Cl.
CPC ...... *H04L 47/2483* (2013.01); *H04L 12/4633* (2013.01); *H04L 45/32* (2013.01); *H04L 45/50* (2013.01)

(58) Field of Classification Search
None
See application file for complete search history.

(56) References Cited

U.S. PATENT DOCUMENTS

| | | | |
|---|---|---|---|
| 6,016,310 A * | 1/2000 | Muller | H04L 12/4633 370/255 |
| 8,718,053 B2 | 5/2014 | Raghuraman et al. | |
| 8,953,590 B1 * | 2/2015 | Aggarwal | H04L 12/4675 370/389 |
| 2011/0286452 A1 | 11/2011 | Balus et al. | |
| 2012/0177054 A1 * | 7/2012 | Pati | H04L 12/4625 370/395.53 |
| 2012/0201124 A1 * | 8/2012 | Marques | H04L 45/28 370/221 |

(Continued)

OTHER PUBLICATIONS

Sajassi-Drake et al.; A Network Virtualization Overlay Solution Using EVPN; IETF Internet Draft; Oct. 21, 2013; draft-sd-l2vpn-evpn-overlay-02.

(Continued)

*Primary Examiner* — Peter Chau
(74) *Attorney, Agent, or Firm* — P. Su (57) ABSTRACT

In one embodiment, a method includes obtaining, at a first provider edge (PE) included a plurality of PEs multi-homed to a first customer edge (CE), traffic intended for the first CE, wherein the traffic includes a first indication, the first indication being configured to identify the traffic as flood traffic. A forwarding PE included in the plurality of PEs suitable to use to forward the traffic to the first CE is identified based on identifying traffic as the flood traffic. The method also includes determining whether the first PE is the forwarding PE, and providing the traffic to the first CE using the first PE when it is determined that the first PE is the forwarding PE. When it is determined that the first PE is not the forwarding PE, the traffic is filtered using the first PE.

18 Claims, 12 Drawing Sheets

(56) References Cited

U.S. PATENT DOCUMENTS

| | | |
|---|---|---|
| 2014/0092907 A1 | 4/2014 | Sridhar et al. |
| 2014/0169382 A1 | 6/2014 | Melman et al. |
| 2015/0055651 A1* | 2/2015 | Shen .................. H04L 12/1854 370/390 |
| 2015/0280928 A1* | 10/2015 | Tessmer .................. H04L 49/70 370/390 |

OTHER PUBLICATIONS

Rabadan et al.; "Data Center Interconnect Solution for EVPN Overlay Networks"; IETF Internet Draft; Feb. 14, 2014; draft-rabadan-l2vpn-dci-evpn-overlay-01.

Govindan et al.; "Proactive fault detection in EVPN"; IETF Internet Draft; Feb. 14, 2014; draft-govindan-l2vpn-evpn-bfd-01.

* cited by examiner

REDUCING TRANSIENT PACKET DUPLICATION AND IMPROVING SPLIT-HORIZON FILTERING

TECHNICAL FIELD

The disclosure relates generally to network communications. More particularly, the disclosure relates to reducing transient packet duplication and to improving split-horizon filtering.

BACKGROUND

VXLAN is a network virtualization technology that provides layer 2 overlay on a layer 3 network by encapsulating Ethernet payloads in Internet Protocol (IP) and User Datagram Protocol (UDP) (IP/UDP). Border Gateway Protocol (BGP) Ethernet Virtual Private Networks (EVPNs) May be used as a control plane for VXLAN overlays. Network Virtualization using Generic Routing Encapsulation (NVGRE) is another network virtualization technology that also provides layer 2 overlay on a layer 3 network by utilizing Ethernet encapsulation in IP.

When unicast replication at a head end is in use, multi-destination traffic is encapsulated in a unicast VXLAN Tunnel Endpoint (VTEP) IP address. Multi-destination traffic typically includes broadcast, unknown unicast, and multicast traffic. As a result if the encapsulation of multi-destination traffic, duplicate packets may be delivered to an end station. Similarly, when EVPN is used as a control plane with VXLAN encapsulation, duplicate packets may also be delivered to an end station. The inability to distinguish a difference between a known unicast packet and a unicast head end replicated packet resulting from an unknown unicast in a VXLAN header causes duplicate packets to be delivered to an end station.

BRIEF DESCRIPTION OF THE DRAWINGS

The disclosure will be readily understood by the following detailed description in conjunction with the accompanying drawings in which.

DESCRIPTION OF EXAMPLE EMBODIMENTS

General Overview

According to one aspect, a method includes obtaining, at a first provider edge (PE) included a plurality of PEs multi-homed to a first customer edge (CE), traffic intended for the first CE, wherein the traffic includes a first indication, the first indication being configured to identify a packet as a part of flood traffic. A forwarding PE included in the plurality of PEs suitable to use to forward the traffic to the first CE may be identified once the packet is identified as part of the flood traffic. The method also includes determining whether the first PE is the forwarding PE, and providing the traffic to the first CE using the first PE when it is determined that the first PE is the forwarding PE. When it is determined that the first PE is not the forwarding PE, the traffic is filtered using the first PE.

Description

In Border Gateway Protocol (BGP) Ethernet Private Networks (EVPNs) that utilize Internet Protocol (IP) and User Datagram Protocol (UDP) based encapsulations, unicast replication is often used for multi-destination traffic, or traffic that is intended for more than one destination. Utilizing unicast replication for multi-destination traffic typically leads to transient packet duplication, and may result in reduced performance with respect to split-horizon filtering. IP-based encapsulations may include Virtual Extensible Local Area Network (VXLAN) encapsulation and Network Virtualization using Generic Routing Encapsulation (NVGRE) encapsulation.

Multi-protocol Label Switching (MPLS) is a packet-forwarding technology which uses labels to make forwarding decisions. In an MPLS network, packets which contain data are assigned labels which allow forwarding decisions to be made substantially without a need to inspect the packets.

VXLAN is a network virtualization technology that encapsulates Media Access Control (MAC) based addresses and provides scalability. VXLAN provides MAC in IP/UDP encapsulation. NVGRE is a network virtualization technology that utilizes encapsulation and tunneling to create Virtual Local Area Networks (VLANs) that may span a data link layer and a network layer. VXLAN and NVGRE are generally network layer, or layer 3, Internet Protocol (IP) based network virtualization technologies that may add to a data link layer, or layer 2, frame with a new IP header in order to provide layer 3 based tunneling capabilities.

In current networks, provider edges (PEs) which are multi-homed to a host or a customer edge (CE) may be flooded with unknown unicast destinations such that each PE forwards copies of a packet to the CE. As a result, transient packet duplication results, and the CE receives multiple copies of the packet, e.g., one copy from each PE that is multi-homed to the CE. By way of example, when a first PE and a second PE which are VXLAN Tunnel Endpoints (VTEPs) that are dual-homed via an Ethernet Segment attached to a host with an address unknown to a sending PE that sends copies of a packet to the first PE and the second PE, the first PE and the second PE may each provide their copies of the packet to the host.

To substantially eliminate transient packet duplication and prevent a host or a CE from receiving or otherwise obtaining multiple copies of the same packet, an indication may be provided in the copies of the packet which identifies the packet as being included in broadcast, unknown unicast, and multicast (BUM) traffic, or flood traffic. Such an indication may be arranged to indicate that the packet is part of BUM traffic or flood traffic. In one embodiment, when a receiving PE obtains a packet that includes an indication that identifies the packet as being included in flood traffic, the receiving PE may use the indication to determine whether it is to forward the packet or whether it is to filter out the packet. As a result, when only one PE that is multi-homed to a CE provides a copy of a packet to the CE, transient packet duplication may effectively be eliminated.

An indication that effectively identifies a packet as being included in flood traffic may be used to improve the performance associated with split-horizon filtering. As will be appreciated by those skilled in the art, split-horizon filtering prevents routing loops by effectively ensuring that a given packet is not routed back in the direction from which the given packet was received. EVPN generally utilizes an MPLS label for a split-horizon, e.g., a label which is used to effectively prevent a multi-destination frame from entering into a routing loop.

In one embodiment, an MPLS label is inserted into packets to indicate BUM traffic or flood traffic. A multi-homed PE that receives or otherwise obtains a packet that includes such an MPLS label may recognize the label, and may perform filtering of the traffic which includes the packet based on designated forwarder election rules. The MPLS label may be advertised for example in a P-Multicast Service Interface (PMSI) tunnel attribute with an inclusive multicast route, and is generally applicable to point-to-multipoint (P2MP) label switched paths (LSPs), point-to-point (P2P) LSPs, and multipoint-to-point (MP2P) LSPs used for ingress replication. For a VXLAN and NVGRE encapsulation, a dedicated unicast IP address for a given VXLAN tunnel/endpoint (VTEP) that is distinct from a unicast IP address used for known unicast traffic may be set aside for BUM traffic or flood traffic.

Figure 1:
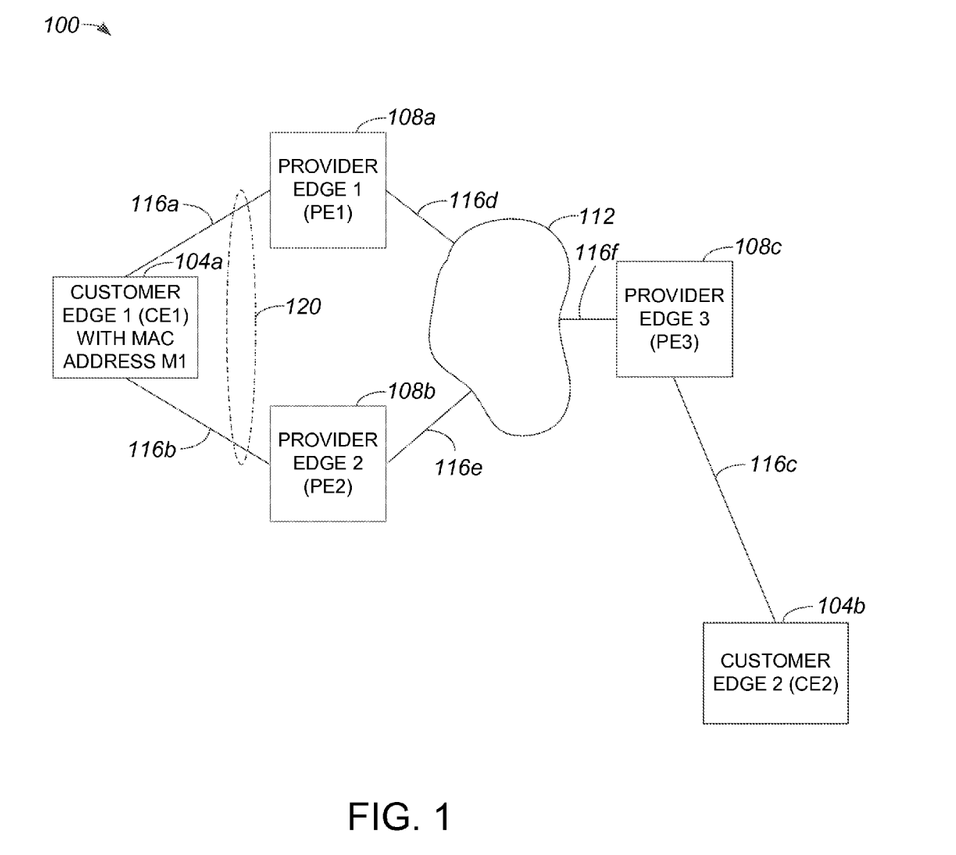
FIG. 1 is a diagrammatic representation of an overall network which includes multi-homed provider edges (PEs), e.g., dual-homed PEs, arranged to filter flood traffic which includes an indicator arranged to identify the flood traffic in accordance with an embodiment.

Referring initially to FIG. 1, an overall network which includes multi-homed PEs arranged to filter flood traffic, where the flood traffic includes an indicator arranged to identify the flood traffic will be described in accordance with an embodiment. An overall network 100, which may be a BGP EVPN that utilizes VXLAN or NVGRE encapsulation, includes CEs 104a, 104b, and PEs 108a-c. In one embodiment, CEs 104a, 104b may be routers at customer sites and PEs 108a-c may be routers in service provider networks.

PE1 108a and PE2 108b are multi-homed or, more specifically, dual-homed to CE1 104a. As will be appreciated by those skilled in the art, multi-homing allows CE1 104a to be effectively connected to more than one PE, e.g., PE1 108a and PE2 108b, such that redundancy is provided in the event or a failure with respect to either link 116a or link 116b, and/or a failure with respect to either PE1 108a or PE2 108b. Links 116a, 116b may form an Ethernet segment 120 that connects CE1 104a to PE1 108a and to PE2 108b. PE1 108a and PE2 108b are a multi-homed or, more specifically, dual-homed redundancy group.

CE2 104b is linked to PE3 108c by a link 116c. Link 116c may generally be an attachment circuit that attaches CE 104b to PE3 108c. PE3 108c is linked to a network 112 through a link 116f, while PE1 108a is linked to network 112 through a link 116b and PE2 108b is linked to network 112 through a link 116e. Thus, traffic from CE2 104b that is intended for CE1 104a may be forwarded to CE1 104a through PE3 108c and either PE1 108a or PE2 108b.

It should be appreciated that network 112 may be a service provider network or a data center network, In general, network 112 provides IP connectivity to PE1 108a, PE2 108b, and PE3 108c, as well as to other PEs (not shown). In one embodiment, network 112 may be an underlay network for VXLAN or NVGRE overlays.

Figure 2A:
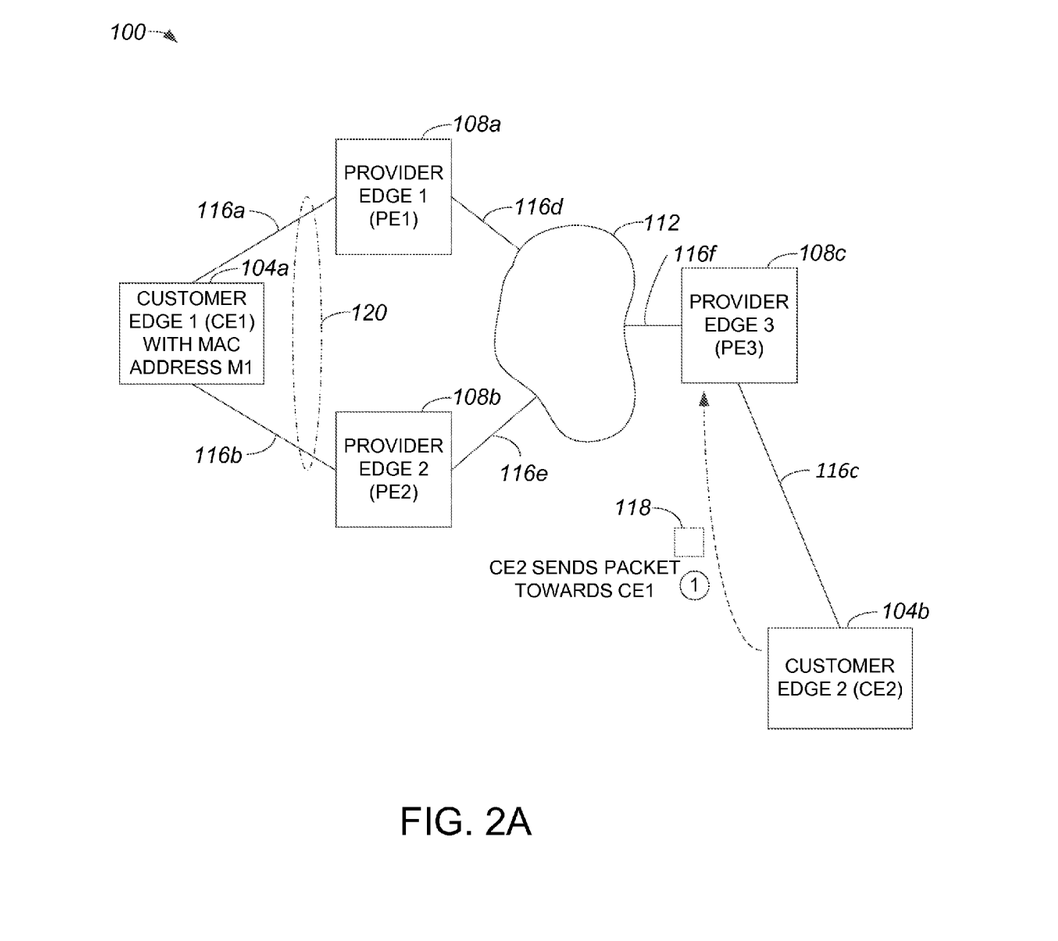
FIG. 2A is a diagrammatic representation of an overall network which includes multi-homed PEs, e.g., overall network 100 of FIG. 1, at a time t1 at which a packet is sent towards a receiving customer edge (CE) in accordance with an embodiment.

At a time t1, CE2 104b may send unicast traffic, or at least one packet, to PE3 108c. Packet 118 may have a destination address set to the address of CE1 104a. FIG. 2A shows overall network 100 at a time t1 at which a packet is sent by CE2 104b towards CE1 104a in accordance with an embodiment. CE2 104b may obtain a packet 118 from a node (not shown) that is in communication with CE2 104b. At time t1, CE2 104b provides packet 118 to PE3 108c.

Figure 2B:
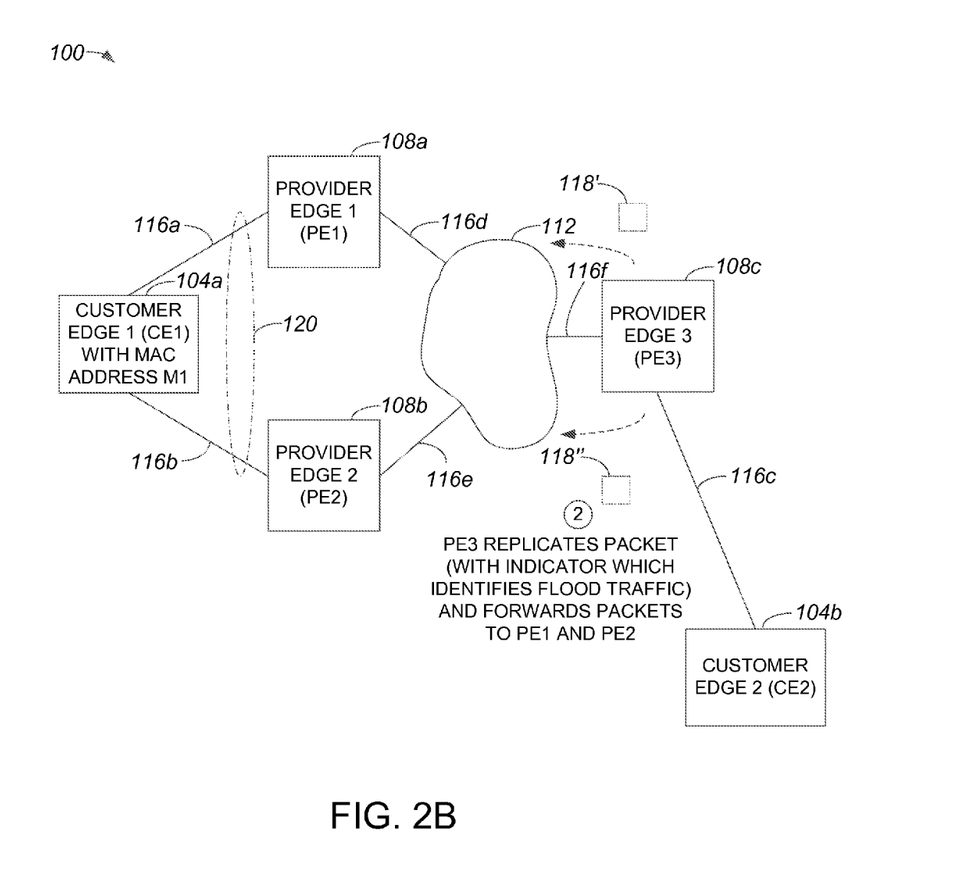
FIG. 2B is a diagrammatic representation of an overall network which includes multi-homed PEs, e.g., overall network 100 of FIG. 1, at a time t2 at which a packet intended for a receiving CE is replicated by a PE in accordance with an embodiment.

Upon receiving or otherwise obtaining packet 118, PE3 108c looks up a packet destination address, which may be the MAC address of CE1 104a in its forwarding table. As will be appreciated by those skilled in the art, a lookup miss in the forwarding table generally leads to PE3 108c flooding packet 118 in a broadcast domain. PE3 108c thus replicates packet 118 for flooding, as indicated in FIG. 2B, to create copies 118', 118" of packet 118. Packet 118 is replicated such that copies 118', 118" of packet 118 may be sent to each PE 108a, 108b that is multi-homed to CE1 104a. Copies 118', 118" include an indicator which indicates that the payload of a VXLAN or NVGRE packet effectively carries a packet that is being flooded.

Figure 2C:
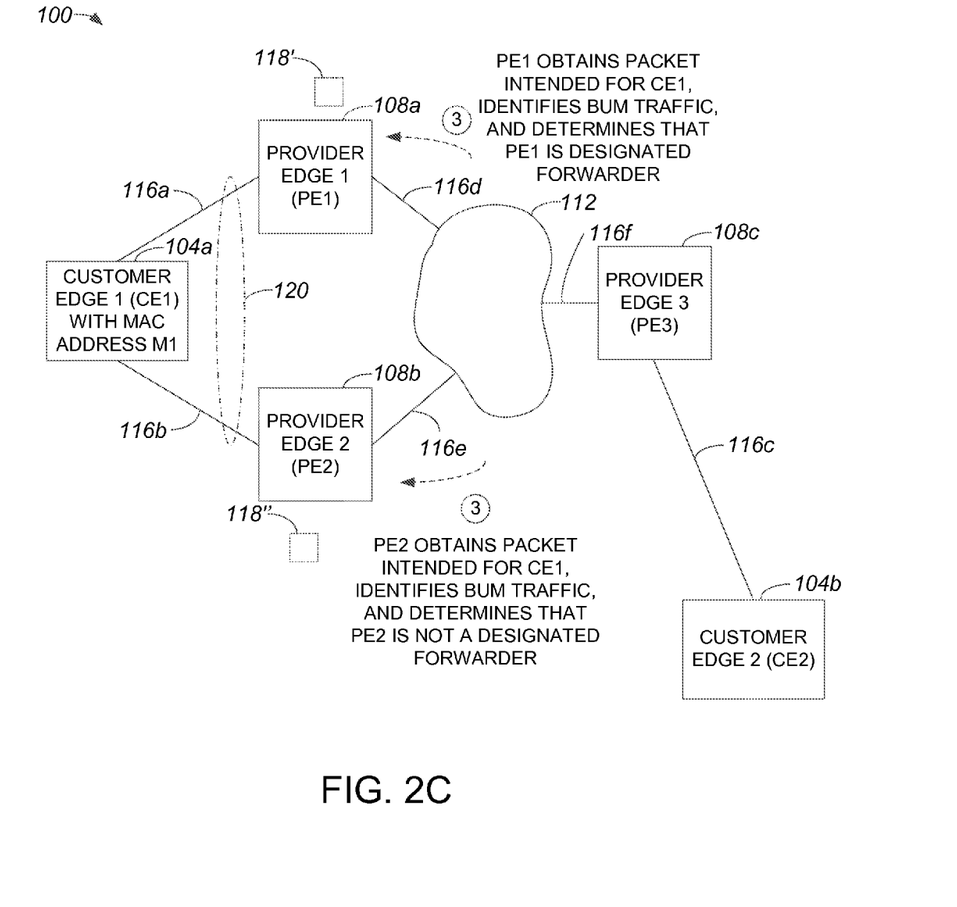
FIG. 2C is a diagrammatic representation of an overall network which includes multi-homed PEs, e.g., overall network 100 of FIG. 1, at a time t3 at which replicated packets are provided to the multi-homed PEs in accordance with an embodiment.

At a time t3, as shown in FIG. 2C, PE 108*c* forward copies 118', 118" through network 112 towards CE1 104*a*. Copy 118' is forwarded on link 116*d* to PE1 108*a* en route to CE1 104*a*, and copy 118" is forwarded on link 116*e* to PE2 108*b* en route to CE1 104*a*. PE1 108*a* obtains copy 118', while PE2 108*b* obtains copy 118".

PE1 108*a* may inspect or otherwise process copy 118' to determine that copy 118' is BUM traffic or flood traffic, and also determine that PE1 108*a* is a designated forwarder for the traffic and, hence, copy 118'. Similarly, PE2 108*b* may inspect or otherwise process copy 118" to determine that copy 118" is BUM traffic or flood traffic, and also determine that PE2 108*b* is not a designated forwarder for the traffic or for copy 118".

Figure 2D:
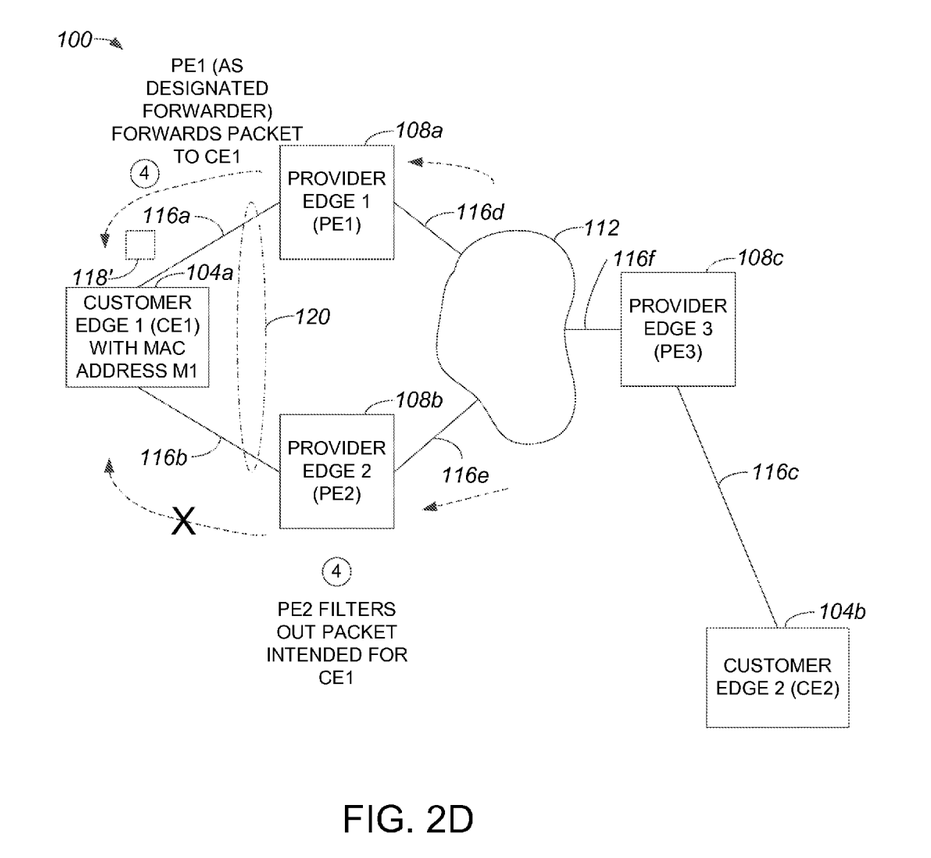
FIG. 2D is a diagrammatic representation of an overall network which includes multi-homed PEs, e.g., overall network 100 of FIG. 1, at a time t4 at which a packet is provided to a receiving CE by the multi-homed PE identified as a designated forwarder in accordance with an embodiment.

After PE1 108*a* identifies itself as a designated forwarder for traffic that includes copy 118', PE1 108*a* forwards copy 118' to CE 104 over Ethernet segment 120 or, more specifically, link 116*a* at a time t4, as shown in FIG. 2D. As PE2 108*b* has identified itself as not being a designated forwarder for traffic that includes copy 118", PE2 108*b* filters out copy 118" at time t4. That is, copy 118" is not forwarded to CE1 104*a*.

Figure 3:
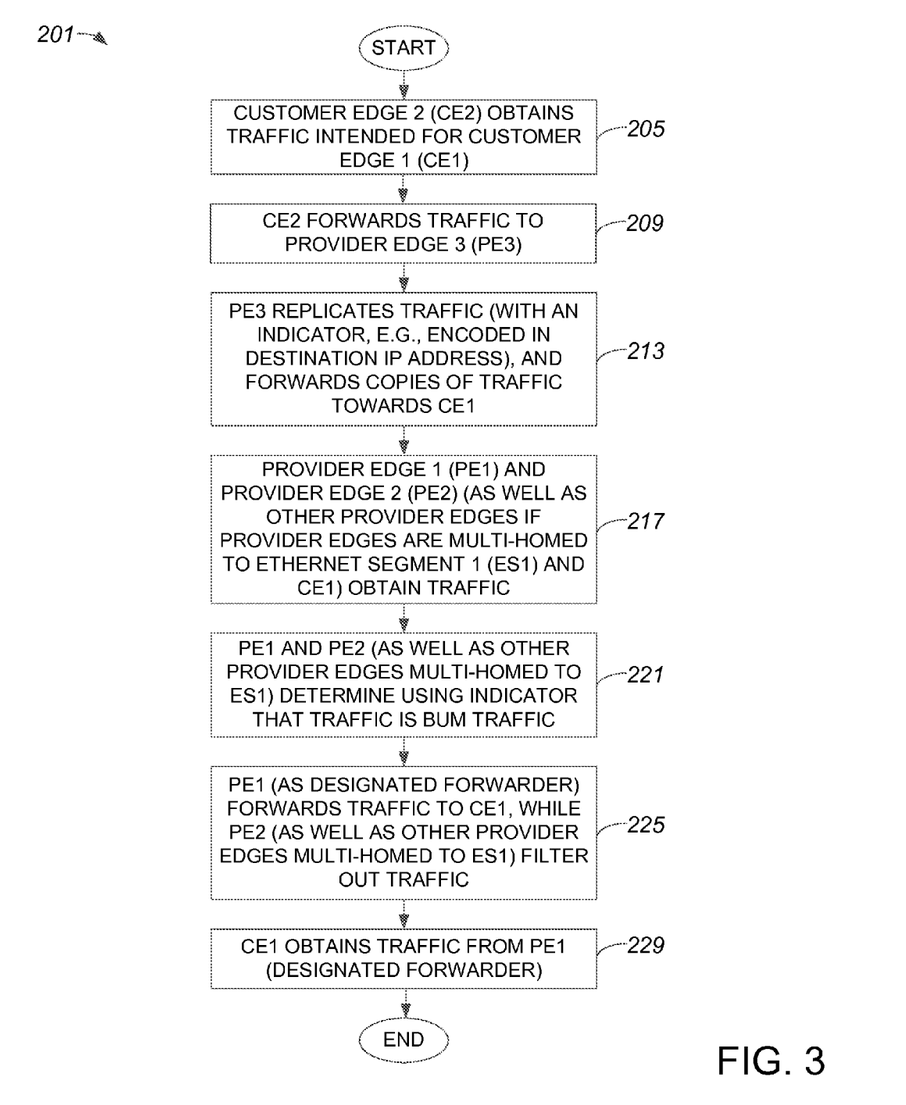
FIG. 3 is a process flow diagram which illustrates a method of providing broadcast, unicast unknown and multicast (BUM) traffic from a sending customer edge to a receiving customer edge such that the receiving customer edge does not receive transient duplicated packets in accordance with an embodiment.

With reference to FIG. 3, a method of providing BUM traffic from a sending CE to a receiving CE such that the receiving CE does not receive transient duplicated packets will be described in accordance with an embodiment. A method 201 of providing BUM traffic from a sending CE to a receiving CE begins at step 205 in which a sending CE, e.g., CE2 108*b* of FIGS. 2A-D, obtains BUM traffic intended for a receiving CE, e.g., CE1 108*a* of FIGS. 2A-D. Hereinafter, for ease of discussion, the sending CE will be referred to as CE2 and the receiving CE will be referred to as CE1. In one embodiment, CE2 may obtain traffic from a customer node.

In step 209, CE2 forwards traffic to a provider edge, e.g., PE3 108*c* of FIGS. 2A-D, which is in communication with CE2. Upon obtaining the traffic, PE3 may replicate the traffic in step 213, and may forward copies of the traffic towards CE1, i.e., the receiving CE. The copies of the traffic, in one embodiment, include an indicator arranged to indicate flood traffic. An indicator may be encoded in a destination IP address, in one embodiment. The indicator, as previously mentioned, may be a dedicated unicast IP address and/or any other suitable indicator that is understood to effectively indicate that a packet in which the indicator is contained is included in BUM traffic or flood traffic.

After PE3 forwards copies of traffic towards CE1, as for example through a network, PEs that are multi-homed to CE1 receive or otherwise obtain the copies of traffic in step 217. In the described embodiment, with reference to FIGS. 2A-D, PEs that are multi-homed to CE1 are PE1 and PE2. PE1 and PE2 are multi-homed or, more specifically, dual-homed to CE1 and ES1.

From step 217, process flow moves to step 221 in which PE1 and PE2, as well as other PEs that may be multi-homed to ES1 and CE1, use the indicator included in the copies of traffic to determine that the traffic is BUM traffic or flood traffic. Upon determining that the traffic is BUM or flood traffic, the PEs that are multi-homed to CE1 use the outcome of an EVPN designated forwarder election to determine if the receiving PE is a designated forwarder, i.e., the PEs identify which of the PEs is a designated forwarder. In step 225, PE1 is identified as a designated forwarded and, as such, forwards the traffic to CE1, while PE2 filters out the traffic, e.g., does not forward the traffic to CE1. CE1 obtains traffic from PE1 in step 229, and the method of providing BUM traffic from a sending CE to a receiving PE is completed, with CE1 receiving a single copy, and no duplicate copies, of the flooded traffic from CE2.

Figure 4A:
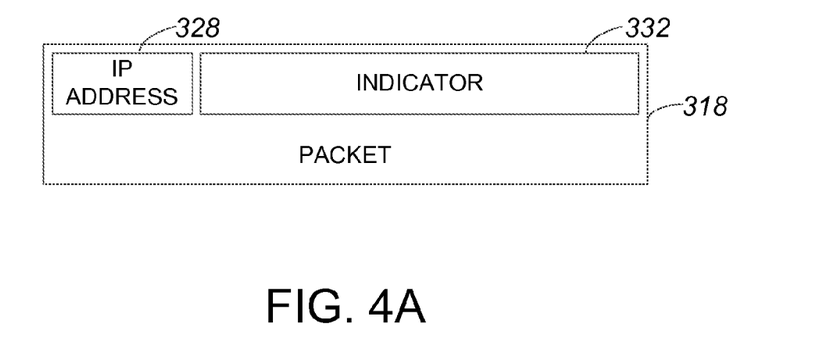
FIG. 4A is a diagrammatic representation of a packet in which an indicator arranged to facilitate an identification of a flooded packet is provided in the packet following an Internet Protocol (IP) address in accordance with an embodiment.

An indicator that is used to indicate flood traffic is generally included in a packet, and may be incorporated substantially anywhere within the packet. For example, an indicator may be located in a packet either following an IP address or in the IP address. The IP address may be a destination IP address in a packet header. FIG. 4A is a diagrammatic representation of a packet in which an indicator arranged to facilitate an identification of a transient duplicate packet, or a flood packet, is provided in the packet following an IP address in accordance with an embodiment. A packet 318, which is included in BUM traffic or flood traffic, includes an IP address 328. An indicator 332, which may be used to identify packet 318 as being part of BUM traffic or flood traffic, is included in packet 318 following IP address 328. Indicator 332 may be any suitable flag, as for example in a VXLAN header, which identifies packet 318 as being a component of BUM traffic or flood traffic.

Figure 4B:
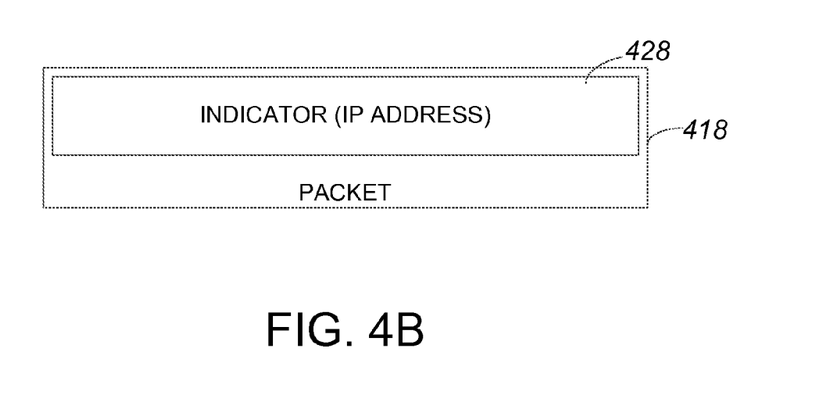
FIG. 4B is a diagrammatic representation of a packet in which an indicator arranged to facilitate an identification of a flooded packet is provided in the packet substantially in an IP address in accordance with an embodiment.

FIG. 4B is a diagrammatic representation of a packet in which an indicator arranged to facilitate an identification of a flood packet is provided in the packet substantially in an IP address in accordance with an embodiment. A packet 418, which is included in BUM traffic or flood traffic, includes an IP address 428. IP address 428, which is effectively an indicator that may be used to identify packet 418 as being part of BUM traffic or flood traffic, is a dedicated IP address set aside to effectively identify flood traffic. This dedicated IP address is a separate IP address than an IP address used for sending known unicast traffic. The sender or provider of the traffic may select IP address 428 to be set to the IP address set aside, or otherwise earmarked, for identifying flooding. That is, IP address 428 may be set to the IP address used to identify a packet that is sent as a part of flood action. This IP address may be signaled via BGP EVPN Inclusive Multicast Route as the IP address of an originator router, along with a PMSI tunnel attribute.

In general, a PE is positioned within an overall network between an area administered by one service provider and an area administered by another service provider. That is, a PE is an edge node in a service provider network. It should be appreciated that in a data center environment, in lieu of a PE, a data center switch may serve the same purpose as a PE in an overall network. A data center switch may be referred to as a Network Virtualization Endpoint (NVE).

Figure 5:
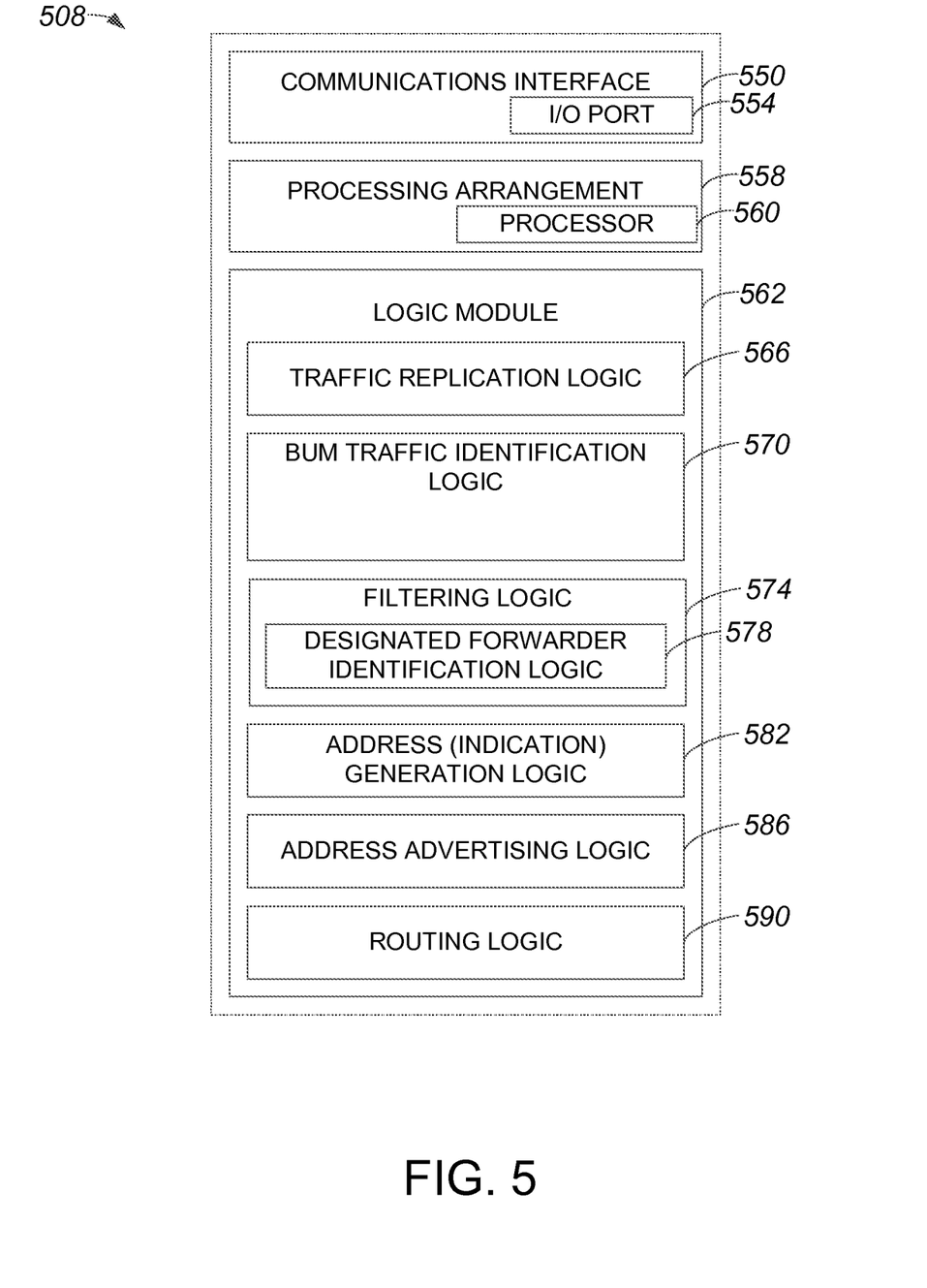
FIG. 5 is a diagrammatic representation of a PE in accordance with an embodiment.

Although a PE may generally be any suitable node within an overall network, a PE is typically a router. FIG. 5 is a diagrammatic representation of a PE in accordance with an embodiment. A PE 508 includes a communications interface 550, a processing arrangement 558, and a logic module 562.

Communications interface 550 allows PE 508 to communicate within an overall network, as for example with a CE or with another PE. Typically, communications interface 550 includes at least one input/output (I/O) port 554 configured to send traffic to and to receive traffic from a network.

Processing arrangement 558 includes at least one processor 560 that is configured. Logic module 562 includes hardware and/or software logic that is arranged to be executed by processor arrangement 558. Logic module 562 includes traffic replication logic 556, BUM traffic identification logic 570, filtering logic 574, address generation logic 582, address advertising logic 586, and routing logic 590. Traffic replication logic 566 is arranged to effectively create a copy of a packet obtained through communications interface 550 as needed, e.g., when the packet is included in flood traffic. BUM traffic identification logic 576 identifies BUM traffic, or a packet included in BUM traffic, and cooperates with traffic replication logic 455 to cause BUM traffic to be replicated for forwarding towards a destination.

Filtering logic 574 is arranged to filter out received packets, e.g., packets obtained through communications interface 550, to identify packets that are to be forwarded by PE 508 and packets that are to be filtered out and not forwarded by PE 508. Filtering logic 574 is configured, in one embodiment, to determine whether a receiving PE should or should not forward the packet. That is, filtering logic 574 may be configured to determine whether PE 508 is to forward a packet. Designated forwarder identification logic 578, which is included in filtering logic 574, may use the indication in the packet to determine whether the packet is part of flooding action. The indication may include, but is not limited to including, an dedicated IP address for flood traffic, a flag in a VXLAN header, or any other suitable indication included in the packet. Designated forwarder identification logic 578 may identify whether PE 508 is a designated forwarder for a broadcast domain. If PE 508 is a designated forwarder for a packet, routing logic 590 may generally route the packet towards a destination. Alternatively, if PE 508 is not a designated forwarder for a packet, filtering logic 574 may filter out the packet and essentially prevent the packet from being forwarded toward a destination.

Address generation logic 582 is generally arranged to generate an address, or an indication, that may be included in a packet to indicate that the packet is a part of flood traffic, e.g., is included in BUM traffic. In one embodiment, when PE 508 is part of a redundancy group of PEs, address advertising logic 586 is arranged to advertise an address associated with PE 508 to the other PEs of the redundancy group.

In addition to effectively eliminating transient packet duplication for EVPN with VXLAN encapsulations, as well as for other suitable IP-based encapsulations, the use of an indicator which indicates BUM traffic or flood traffic may improve split-horizon filtering for EVPN with VXLAN encapsulations. The need to perform a lookup to identify a VXLAN outer source IP address as a part of applying split-horizon filtering may be significantly reduced. As will be appreciated by those skilled in the art, in the context of split-horizon filtering, an egress PE may perform a lookup for an outer source IP address when ingress replication is used. By way of example, a first PE that is part of a dual-homed redundancy group may advertise a unicast IP address to a second PE that is included in the redundancy group, and the second PE may use the unicast IP address as a VXLAN outer destination IP address each time the second PE is to send flood traffic to the first PE. When the first PE receives a packet from the second PE, the first PE may use the VXLAN outer destination IP address included in the packet to identify the packet as BUM traffic or flood traffic and apply designated forwarding procedures. In addition, the first PE may also identify the second PE as having sent the packet, and apply a local-bias procedure for split-horizon filtering, as both the first PE and the second PE are in the same redundancy group.

Figure 6A:
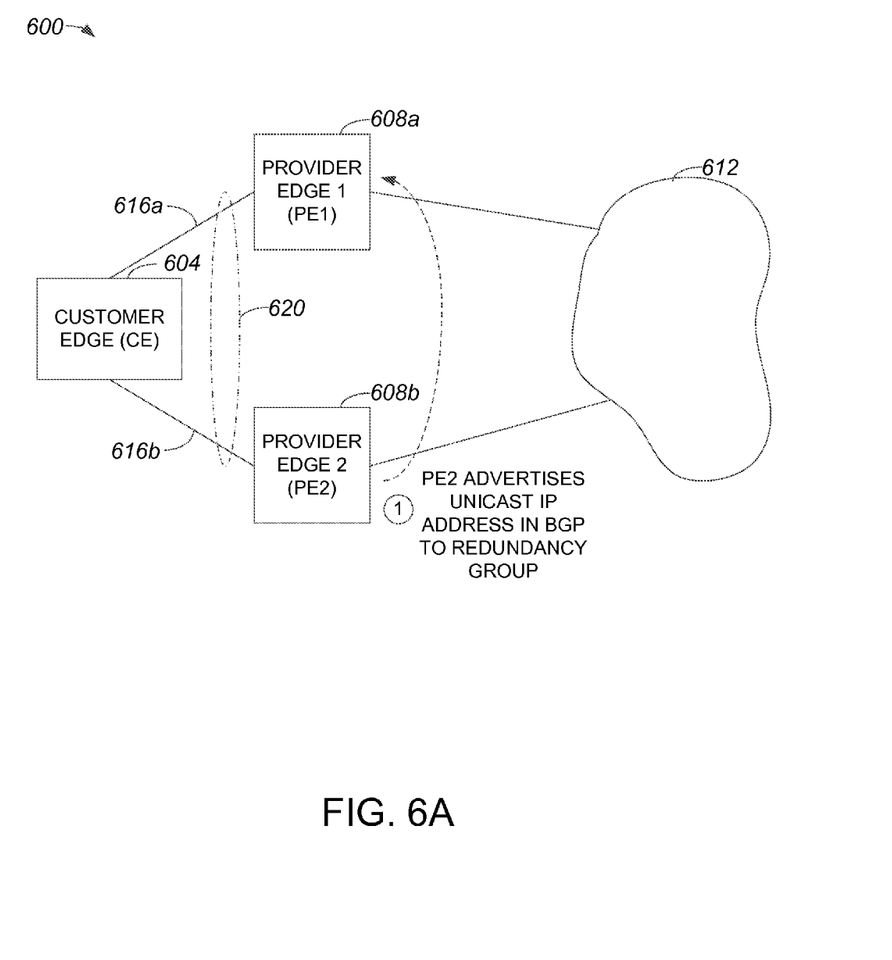
FIG. 6A is a diagrammatic representation of an overall network in which PEs are part of a redundancy group that is multi-homed to a CE at a time t1 when a second PE advertises a unicast IP address to the redundancy group in accordance with an embodiment.

FIG. 6A is a diagrammatic representation of an overall network in which PEs are part of a redundancy group that is multi-homed to a CE at a time t1 when a second PE advertises a unicast IP address to the redundancy group in accordance with an embodiment. Within an overall network 600, PE1 608a and PE2 608b form a redundancy group such that PE1 608a and PE2 608b are multi-homed or, more specifically, dual-homed to a CE 604. As will be appreciated by those skilled in the art, for active/standby redundancy, when PE1 608a is a primary node within the redundancy group, PE2 608b may be a backup node. Similarly, when PE2 608b is a primary node within the redundancy group, PE1 608a may be a backup node. For active/active redundancy, PE1 608a may be a designated forwarder for multi-destination traffic, while PE2 608b may be a non-designated forwarder for multi-destination traffic. An Ethernet Segment 620 that includes links 616a, 616b effectively connects PE1 608a and PE2 608b to CE 604. Both PE1 608a and PE2 608b may obtain information from, and provide information to, a network 612 arranged to include and/or to communicate with other PEs (not shown).

At a time t1, PE2 608b advertises a unicast IP address in BGP to PE1 608a. In one embodiment, PE2 608b may advertise a different unicast IP address in BGP to every other member of its redundancy group. As such, when PE1 608a and PE2 608b are dual-homed to CE 604, PE1 608b advertises one unicast IP address in BGP. When the unicast IP address is subsequently included in a packet of BUM traffic, the unicast IP address is arranged to allow PE1 608a to identify the packet as BUM traffic originating from the other PE in the redundancy group, i.e., PE2 608b, and to apply a local-bias procedure for split-horizon filtering.

Figure 6B:
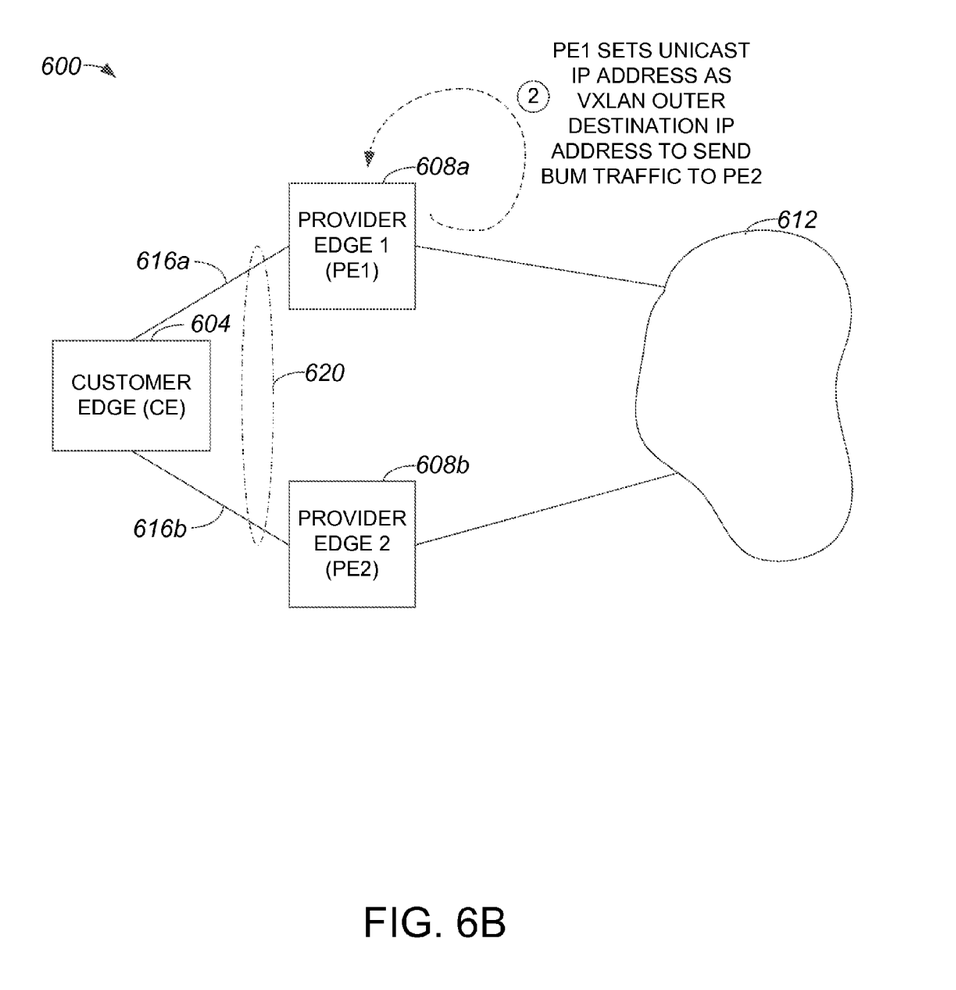
FIG. 6B is a diagrammatic representation of an overall network, e.g., overall network 600 of FIG. 6A, in which PEs are part of a redundancy group that is multi-homed to a CE at a time t2 when a first PE sets a unicast IP address obtained from a second PE as an outer destination Internet Protocol (IP) address in accordance with an embodiment.

As shown in FIG. 6B, after obtaining the unicast IP address provided by PE2 608b, PE1 608a sets the obtained unicast IP address as a VXLAN outer destination IP address included in BUM traffic sent by PE1 608a to PE2 608b at a time t2. That is, in a VXLAN packet, an outer destination IP address field included in an outer IP header may be set by PE1 608a as the unicast IP address that was provided to PE1 608a by PE2 608b. The unicast IP address may be distributed, in one embodiment, via a BGP EVPN Ethernet Segment Route.

Figure 6C:
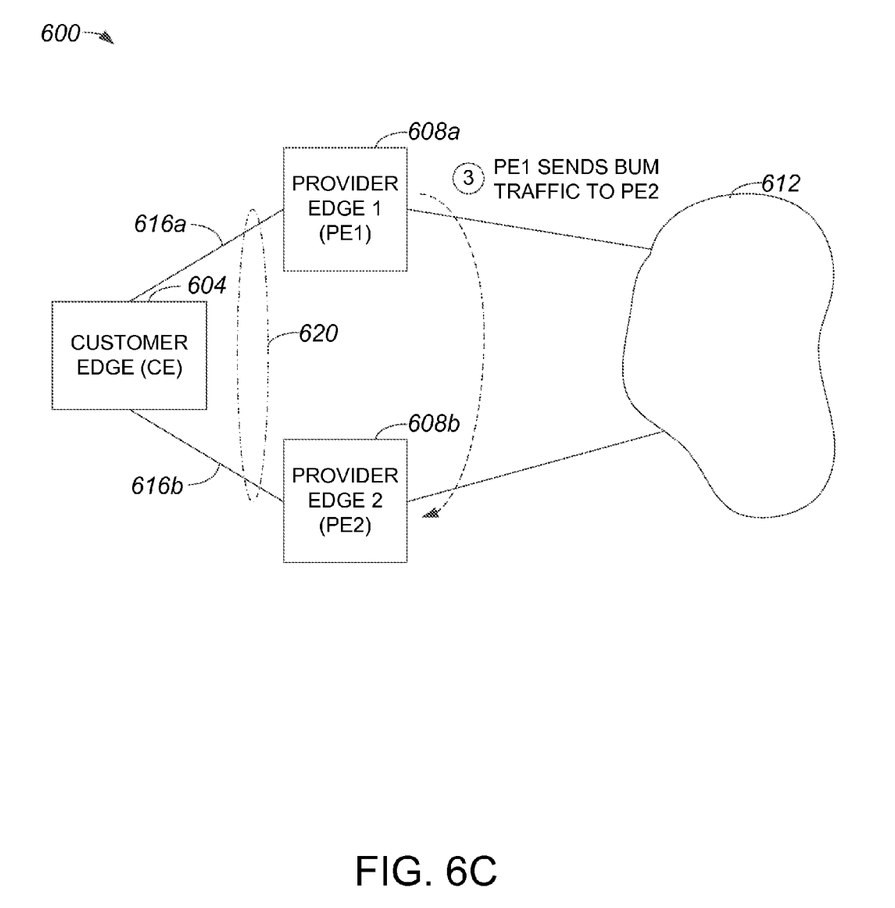
FIG. 6C is a diagrammatic representation of an overall network, e.g., overall network 600 of FIG. 6A, in which PEs are part of a redundancy group that is multi-homed to a CE at a time t3 when a first PE sends BUM traffic to a second PE in accordance with an embodiment.

PE1 608a sends BUM traffic to PE2 608b at a time t3, as shown in FIG. 6C. The BUM traffic sent by PE1 608a to PE2 608b includes at least one VXLAN packet with an outer destination IP address set to the unicast IP address provided by PE2 508b.

Figure 6D:
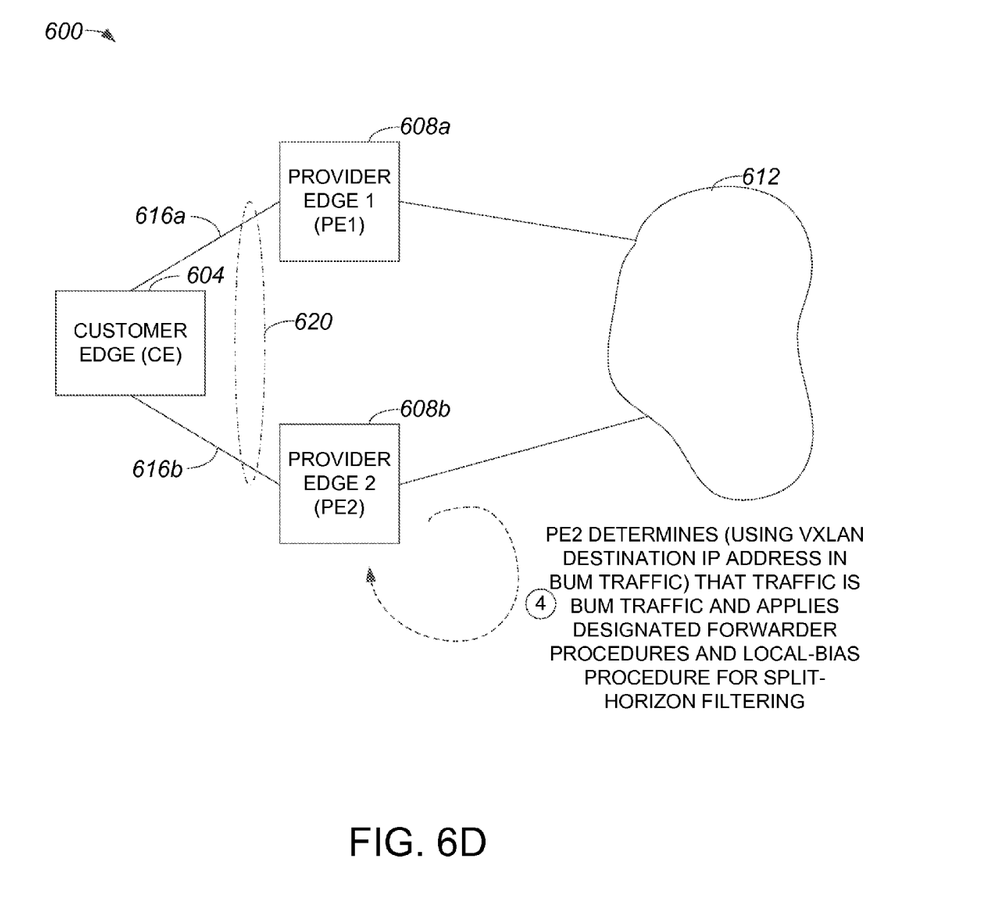
FIG. 6D is a diagrammatic representation of an overall network, e.g., overall network 600 of FIG. 6A, in which PEs are part of a redundancy group that is multi-homed to a CE at a time t4 when a second PE determines that received traffic is BUM traffic in accordance with an embodiment.

As shown in FIG. 6D, upon receiving traffic from PE1 608a, PE2 608b determines at a time t4 that the received traffic is BUM traffic obtained from a PE that is in its redundancy group. The VXLAN outer destination IP address, which is set to the unicast IP address provided by PE2 608b at time t1, may be used by PE2 608b to identify the received traffic as BUM traffic which originated from a PE in its redundancy group. Once PE2 608b identifies the traffic as BUM traffic, PE2 608b may apply a designated forwarder procedure to determine whether PE2 608b is to forward the traffic. In addition, using the VXLAN outer destination IP address, PE2 608b may identify PE1 608a, i.e., the other PE in its redundancy group, as having sent or otherwise provided the traffic to PE2 608b, and may apply a local-bias procedure for split-horizon filtering.

Although only a few embodiments have been described in this disclosure, it should be understood that the disclosure may be embodied in many other specific forms without departing from the spirit or the scope of the present disclosure. By way of example, PEs that are dual-homed to a CE have been described, it should be appreciated that PEs may generally be multi-homed to a CE. That is, a CE may effectively be connected to two or more PEs such that two or more PEs are included in a redundancy group that supports the CE.

The inclusion of an indication such as a dedicated unicast IP address in packets subject to unicast replication for multi-destination traffic has generally been described as suitable for use in networks utilizing EVPN with VXLAN encapsulation and/or NVGRE encapsulation. However, inclusion of such an indication is not limited to being used in networks utilizing EVPN with VXLAN encapsulation and/or NVGRE encapsulation. For instance, the inclusion of such an indication may be implemented with respect to other IP-based encapsulations. For example, an indication may be used in a network that utilizes EVPN with MPLS encapsulation.

As previously mentioned, an NVE in a data center environment may function in substantially the same manner as a PE in an overall network in the context of this disclosure. In one embodiment, an NVE may be similar in structure to the PE described above with respect to FIG. 5.

The embodiments may be implemented as hardware, firmware, and/or software logic embodied in a tangible, i.e., non-transitory, medium that, when executed, is operable to perform the various methods and processes described above. That is, the logic may be embodied as physical arrangements, modules, or components. A tangible medium may be substantially any computer-readable medium that is capable of storing logic or computer program code which may be executed, e.g., by a processor or an overall computing system, to perform methods and functions associated with the embodiments. Such computer-readable mediums may include, but are not limited to including, physical storage and/or memory devices. Executable logic may include, but is not limited to including, code devices, computer program code, and/or executable computer commands or instructions.

It should be appreciated that a computer-readable medium, or a machine-readable medium, may include transitory embodiments and/or non-transitory embodiments, e.g., signals or signals embodied in carrier waves. That is, a computer-readable medium may be associated with non-transitory tangible media and transitory propagating signals.

The steps associated with the methods of the present disclosure may vary widely. Steps may be added, removed, altered, combined, and reordered without departing from the spirit of the scope of the present disclosure. Therefore, the present examples are to be considered as illustrative and not restrictive, and the examples is not to be limited to the details given herein, but may be modified within the scope of the appended claims.

What is claimed is:

1. A method comprising:
obtaining, at a first provider edge (PE) included in a plurality of PEs multi-homed to a first customer edge (CE), traffic intended for the first CE, wherein the traffic includes a first indication, the first indication being configured to identify the traffic as flood traffic and wherein the first indication is a first unicast Internet Protocol (IP) address that is a flag in a Virtual Extensible Local Area Network (VXLAN) header; and
processing, based on the first indication, the traffic as the flood traffic, wherein processing the traffic as the flood traffic includes identifying a forwarding PE included in the plurality of PEs suitable to use to forward the traffic to the first CE, determining whether the first PE is the forwarding PE, providing the traffic to the first CE using the first PE when it is determined that the first PE is the forwarding PE, and filtering the traffic using the first PE when it is determined that the first PE is not the forwarding PE.

2. The method of claim 1 wherein the traffic is broadcast, unicast unknown, or multicast (BUM) traffic, the first unicast IP address being distinct from a second unicast IP address, the second unicast IP address being associated with known unicast traffic.

3. The method of claim 2 wherein the first unicast IP address is arranged to indicate that a packet in which the first unicast IP address is contained is included in the traffic and is flood traffic.

4. The method of claim 3 wherein the packet includes a packet header, the packet header including a first IP address, wherein the first unicast IP address is included in the packet header following the first IP address.

5. The method of claim 1 wherein obtaining the traffic intended for the first CE includes obtaining the traffic from a second CE through a second PE.

6. The method of claim 5 wherein the traffic includes a first copy of a packet, the first copy of the packet including the first indication, and wherein a second copy of the packet is obtained by a third PE of the plurality of PEs.

7. A tangible, non-transitory computer-readable medium comprising computer program code, the computer program code, when executed, configured to:
obtain, at a first provider edge (PE) included in a plurality of PEs multi-homed to a first customer edge (CE), traffic intended for the first CE, wherein the traffic includes a first indication, the first indication being configured to identify the traffic as flood traffic, and wherein the first indication is a first unicast Internet Protocol (IP) address and is a flag in a Virtual Extensible Local Area Network (VXLAN) header; and
process, based on the first indication, the traffic as the flood traffic, wherein the computer program code configured to process the traffic as the flood traffic is configured to determine whether the first PE is a forwarding PE, to provide the traffic to the first CE using the first PE when it is determined that the first PE is the forwarding PE, and to filter the traffic using the first PE when it is determined that the first PE is not the forwarding PE.

8. The tangible, non-transitory computer-readable medium comprising computer program code of claim 7 wherein the traffic is broadcast, unicast unknown, or multicast (BUM) traffic, the first unicast IP address being distinct from a second unicast IP address, the second unicast IP address being associated with known unicast traffic.

9. The tangible, non-transitory computer-readable medium comprising computer program code of claim 8 wherein the traffic includes a packet having a packet header, the packet header including a first IP address, wherein the first unicast IP address is included in the packet header following the first IP address and is arranged to indicate that the packet is included in the traffic and that the traffic is flood traffic.

10. The tangible, non-transitory computer-readable medium comprising computer program code of claim 7 wherein the computer program code configured to obtain the traffic intended for the first CE is configured to obtain the traffic from a second CE through a second PE.

11. The tangible, non-transitory computer-readable medium comprising computer program code of claim 10 wherein the traffic includes a first copy of a packet, the first copy of the packet including the first indication, and wherein a second copy of the packet is obtained by a third PE of the plurality of PEs.

12. A tangible, non-transitory computer-readable medium comprising computer program code, the computer program code, when executed, configured to:

obtain, at a first provider edge (PE) included in a plurality of PEs multi-homed to a first customer edge (CE), traffic intended for the first CE, wherein the traffic includes a first indication, the first indication being configured to identify the traffic as flood traffic, and wherein the first indication is a first unicast Internet Protocol (IP) address and is a Multi-Protocol Label Switching (MPLS) label for Ethernet Virtual Private Network (EVPN) with MPLS encapsulation; and process, based on the first indication, the traffic as the flood traffic, wherein the computer program code configured to process the traffic as the flood traffic is configured to determine whether the first PE is a forwarding PE, to provide the traffic to the first CE using the first PE when it is determined that the first PE is the forwarding PE, and to filter the traffic using the first PE when it is determined that the first PE is not the forwarding PE.

13. An apparatus comprising:

a processor;

a communications interface, the communications interface configured to obtain traffic intended for a first customer edge (CE), the traffic being obtained through a network; and a logic module, the logic module including logic configured to be executed by the processor, the logic module including traffic identification logic and filtering logic, wherein the traffic identification logic is configured to identify when the traffic includes a first indication arranged to identify the traffic as flood traffic, the first indication being a first unicast Internet Protocol (IP) address associated with the first PE, wherein the first indication is a flag in a Virtual Extensible Local Area Network (VXLAN) header, the filtering logic being arranged to identify a first provider edge (PE) of a plurality of PEs to forward the traffic to the first CE, the plurality of PEs being multi-homed to the first CE, and wherein the filtering logic is further arranged to determine when the apparatus is the first PE and to cause the traffic to be forwarded to the first CE when it is determined that the apparatus is the first PE.

14. The apparatus of claim 13 wherein the filtering logic is arranged to filter out the traffic when it is determined that the apparatus is not the first PE, wherein the filtering logic is arranged to filter out the traffic by preventing the traffic from being forwarded to the first CE.

15. The apparatus of claim 13 wherein the traffic is broadcast, unicast unknown, or multicast (BUM) traffic, the first unicast IP address being distinct from a second unicast IP address associated with the first PE, the second unicast IP address being used with known unicast traffic.

16. The apparatus of claim 13 wherein the communications interface is configured to obtain the traffic through the network from a second CE through a second PE.

17. The apparatus of claim 13 wherein the traffic includes a first copy of a packet, the first copy of the packet including the first indication, and wherein a second copy of the packet is obtained by a second PE of the plurality of PEs.

18. An apparatus comprising:

a processor;

a communications interface, the communications interface configured to obtain traffic intended for a first customer edge (CE), the traffic being obtained through a network; and a logic module, the logic module including logic configured to be executed by the processor, the logic module including traffic identification logic and filtering logic, wherein the traffic identification logic is configured to identify when the traffic includes a first indication arranged to identify the traffic as flood traffic, the first indication being a first unicast Internet Protocol (IP) address associated with the first PE, wherein the first indication is a Multi-Protocol Label Switching (MPLS) label for Ethernet Virtual Private Network (EVPN) with MPLS encapsulation, the filtering logic being arranged to identify a first provider edge (PE) of a plurality of PEs to forward the traffic to the first CE, the plurality of PEs being multi-homed to the first CE, and wherein the filtering logic is further arranged to determine when the apparatus is the first PE and to cause the traffic to be forwarded to the first CE when it is determined that the apparatus is the first PE.

* * * * *